INVENTOR
FRANK E. HOXSIE
BY
*Head & Johnson*
ATTORNEYS

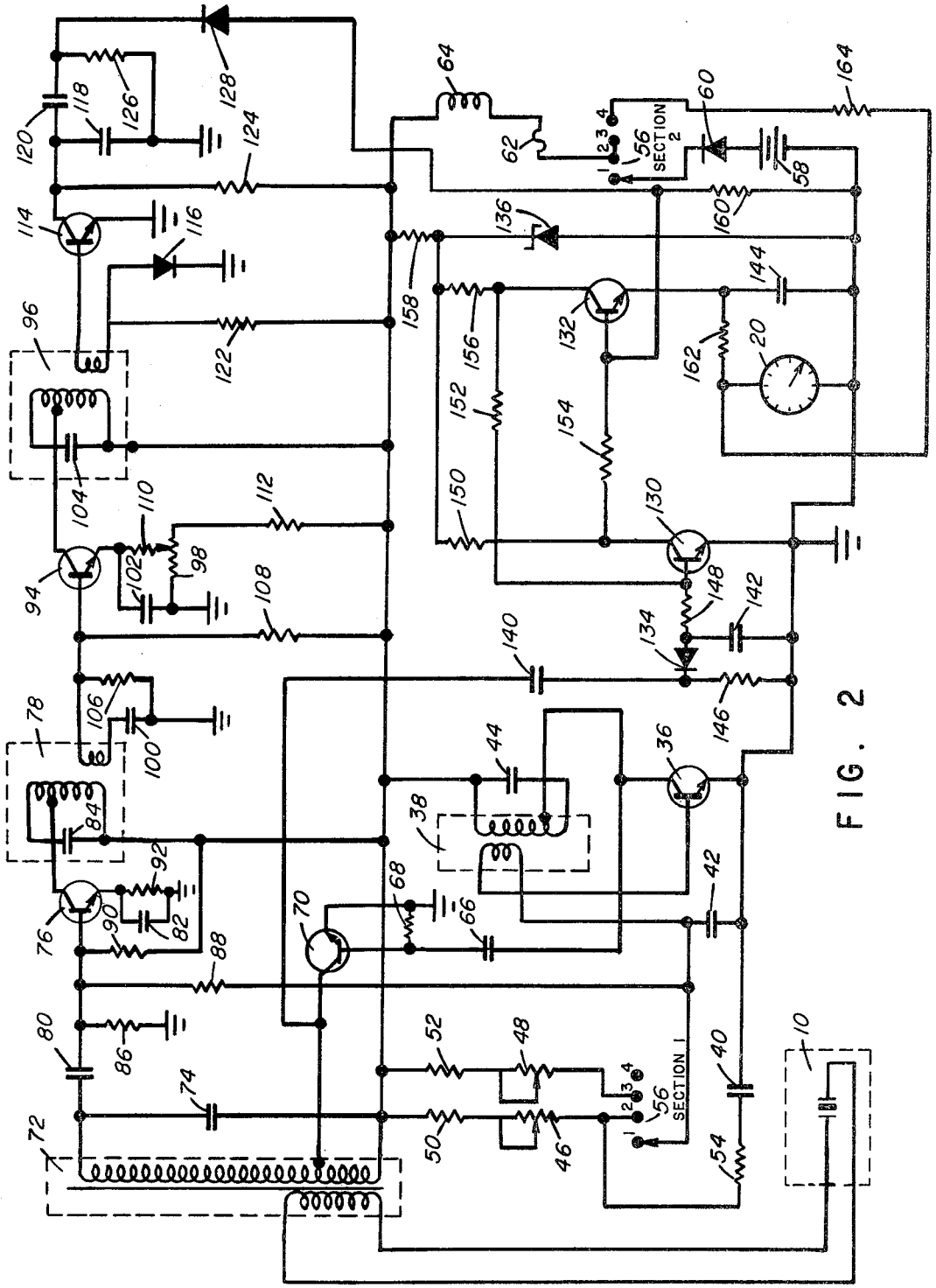

United States Patent Office 3,548,370
Patented Dec. 15, 1970

1

3,548,370
DEPTH SOUNDER
Frank E. Hoxsie, Tulsa, Okla., assignor to Lowrance Electronics Mfg. Corp., Tulsa, Okla., a corporation of Missouri
Filed Sept. 10, 1968, Ser. No. 758,838
Int. Cl. G01s 9/68
U.S. Cl. 340—3
5 Claims

ABSTRACT OF THE DISCLOSURE

This invention relates to a depth sounder for detecting the depth of objects under water. More particularly, the invention provides an improved depth sounder having a transducer means for imparting sound pulses in response to electrical energization and in turn for providing electrical signal output in response to reflected sound pulses, an oscillator circuit providing sequential bursts of electrical energy to the transducer, a receiving amplifier connected to the transducer amplifying the reflected signal output in response to reflected sound waves, a metering circuit connected to the oscillator and the amplifier providing means of indicating the time response between the transmitted signal and the signal received in response to receipt of sound waves as an indication of the distance to the surface reflecting the sound waves from the transducer and a time varying gain controlled circuit connected to the oscillator and receiver amplifier providing a time varying bias to the amplifier following each burst of electrical energy output of the amplifier, the bias being applied to the amplifier circuit serving to increase the amplification of the amplifier with time whereby signals resulting from reflecting surfaces at greater distances from the transducer are amplified more than signals resulting from closer reflective surfaces.

SUMMARY AND BACKGROUND OF THE INVENTION

Electronic depth sounders operate by transmitting pulses of ultrasonic energy from the surface of a body of water downwardly towards the bottom. The bottom reflects part of the sonic energy back to the surbottom reflects part of the sonic energy back to the surface where the echo impinges on a transducer. The transducer converts the ultrasonic energy into electrical energy which is amplified to a level sufficient to activate a circuit which measures the elapsed time between transmission of the pulse and return of the reflected echo. The elapsed time is then translated into distance, this being possible since the velocity of sound can be considered constant at approximately 4,800 feet per second in fresh water with only a slight variation due to temperature or chemical changes.

A problem common to present pulse type depth sounders is the lack of a positive means of controlling the recovery of the amplifier after transmission of the sound pulse. Adequate means of attenuating the main pulse have been demonstrated in prior art but little attention has been given to controlling the amplifier sensitivity throughout the echo receiving period. Ideally, the sensitivity of the amplifier should increase in a manner directly related to the attenuation encountered by sound signal as it passes through greater depths of water. That is, the amplifier gain for a signal returning from a twenty foot bottom should be much less than for a signal returning from a one hundred foot bottom. More precisely, in the ideal arrangement of a pulse type depth sounder the sensitivity

2 of the amplifier versus time following each transmitted pulse should have approximately the same slope as the attenuation of the sound pulse versus the depth of the water.

This invention overcomes the limitation which has existed in known types of depth sounding apparatus. In this invention means is provided for utilizing a ramp voltage to continuously adjust the amplifier gain throughout the echo receiving portion of each sounding cycle in such a manner as to compensate for decreasing amplitude of the return echo as it travels through increasing depths of water.

By providing such improved automatic time varying gain control greater immunity to false depth readings is achieved. In present devices such false depth readings are frequently caused by air bubbles, fish and other underwater debris between the surface and the bottom. In addition, a sound pulse projected in water from a transducer passes downwardly to the bottom, is reflected back up, and is reflected a second time from the surface back down to the bottom, and so forth. This causes a second echo which sometimes returns during a subsequent measuring period producing a spurious signal. By the automatic time varying gain control arrangement of this invention such spurious signals are more easily rejected.

In addition, by this invention wherein the receiver portion of the pulse depth sounder operates at a low gain initially and then increases throughout the sounding period, the time averaged amplifier gain required to sound a given depth of water is reduced. This in turn reduces the amplifier susceptibility to spurious noise signals.

This invention further provides a circuit arrangement for a depth sounder having a manually adjustable gain control and a threshold type detector thereby making it possible to better evaluate the relative size of intervening objects between the surface and the bottom. This is true because the ramp voltage of the time varying gain control compensates the amplifier gain for the large amplitude signals from a small object at a shallow depth so that it is placed in its proper perspective with a low amplitude signal from an object of the same size at a greater depth. By the combination of the time varying gain control plus a manual gain control a total gain control is provided wherein the manual control has superimposed thereon the time varying control. The manual gain control can be advanced to bring smaller echos from smaller objects at greater distances up to the detector threshold, thus the manual gain control having the time varying gain control superimposed thereon provides mean of indicating the relative size of sound reflecting objects.

The depth sounder of this invention includes, basically, a transmitter section, a receiver section, a detector and a timing or metering section. The transmitter includes an oscillator and a power amplifier. The oscillator generates regularly reoccurring pulses of electrical energy at the natural resonant frequency of a transducer. The oscillator also generates a preselected ramp voltage between each of the sequential pulses. This voltage is used in the receiver section as a time varying gain control to regulate automatically the sensitivity as a function of time. The power amplifier increases the power level of the pulses sufficiently to assure an echo from the deepest water to be sounded according to the application of the depth sounder. The power amplifier also acts as a buffer between the oscillator and the transducer.

The receiver section of the depth sounder of this invention includes, in the preferred embodiment, two stages of amplification. The time varying ramp voltage from the oscillator is applied to the first amplifier in such a manner as to automatically vary the gain throughout the receiving portion of each sounding cycle. The second amplifier is provided with a manual gain control so that the overall sensitivity of the depth sounder can be adjusted. In addition, in the preferred arrangement the detector is of the threshold type.

While the metering circuit may be of a variety of arrangements, the illustrated and preferred arrangement includes the use of a bi-stable multivibrator. The transmitted pulse sets the multivibrator in one of two stable states. The returning echo, after being amplified, triggers the multivibrator into the other stable state. A meter measures the average current flow in one of the transistors making up the multivibrator during one of the stable states, that is, between successive transmitted pulses. The average measurement of current flow provides an accurate indication of the depth of the reflective surface from the transducer.

It is therefore a general object of this invention to provide an improved pulse type depth sounder.

More particularly, it is an object of this invention to provide an improved depth sounder including an automatic time varying gain control signal for automatically regulating the gain of the amplifier portion of the depth sounder following each sequential sound pulse whereby the gain of the amplifier which amplifies the echo pulse is increased with time so that echo pulses from more distant objects are amplified more than the echo pulses from nearer objects.

A still more particular object of this invention is to provide an improved pulse type depth sounder including a manual gain control having an automatic time varying gain control signal superimposed thereon.

These objects, as well as more particular objects of the invention, will be understood by referring to the description and claims in conjunction with the attached drawings.

DESCRIPTION OF THE VIEWS

FIG. 2 is a detailed circuit diagram of an operable embodiment of the invention.

DETAILED DESCRIPTION

Figure 1:
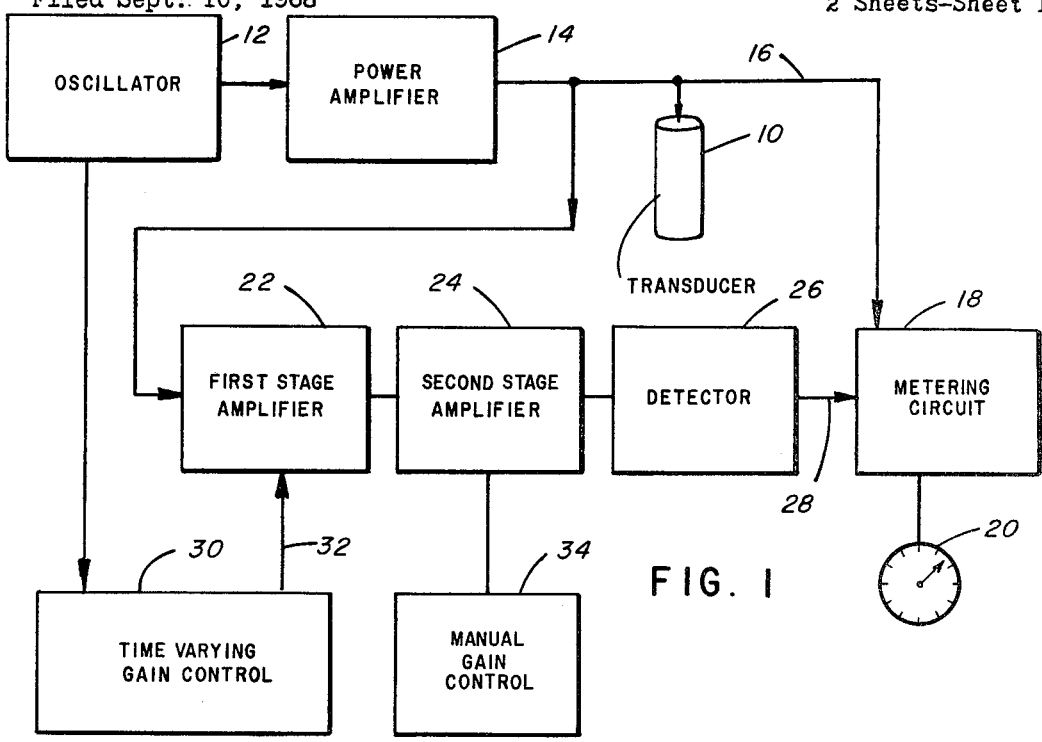
FIG. 1 is a block diagram of the improved pulse type depth sounder of this invention.

Referring first to FIG. 1, an embodiment of the invention is set out in block diagram. A transducer 10 includes a crystal having the characteristic that when it is subjected to electrical energy it responds to produce sonic vibrations and, in turn, when it is subject to sonic vibrations produces electrical energy. When electrically energized sound vibrations pass radially outwardly from transducer 10 and upon encountering a reflective surface, including the bottom of the body of water in which the transducer is positioned, a sound echo is produced. Upon the echo striking transducer 10 the crystal therein is physically vibrated causing an electrical signal.

To provide sound pulses for the energization of transducer 10, an oscillator circuit 12 is utilized. In the preferred arrangement the oscillator 12 produces sequential short bursts of AC energy at the resonant frequency of transducer 10. These bursts of AC energy are applied to power amplifier 14 and, after amplification, to the transducer 10. The signal applied to transducer 10 to produce a sound pulse is also applied by conductor 16 to a metering circuit 18. Metering circuit 18 is preferably of the bi-stable multivibrator type. The signal at conductor 16 serves to set the multivibrator of the metering circuit in one stable condition. The echo received a transducer 10 is applied, by means to be described, to the metering circuit 18 to set the bi-stable multivibrator in the other stable condition. By measurement of the time the metering circuit 18 is in the stable condition at which it exists between the sound producing signal and receipt of the echo signal an indication is given of the distance from the transducer 10 to the surface reflecting the echo. This indication is detected by the total average current flow during such times and is registered in terms of depth in feet on meter 20.

The echo received at transducer 10 is applied to receiver first stage amplifier 22. It can be seen that the sound producing signal from power amplifier 14 is also applied to the receiver first stage amplifier 22, however, this signal is diminished in a way to be described subsequently and, in any event, the signal applied directly to metering circuit 18 by conductor 16 dominates the metering circuit. The echo pulse signal is amplified in first stage 22 and fed to a second stage amplifier 24 and from there the signal is fed to detector 26. The detector 26 is preferably of the threshold type and includes pulse shaping arrangements providing a signal output at conductor 28 to metering circuit 18. When the echo pulse is received, amplified and detected, the bi-stable multivibrator metering circuit 18 is switched to a second condition terminating a measuring cycle.

The depth sounder described up to this point may be termed more or less of a known sonar-type apparatus for measuring distances. This invention is directed towards improvements in this basic arrangement, which improvements make the depth sounder more effective, efficient and dependable.

When a burst of AC energy is initiated in oscillator 12 it is fed to the power amplifier 14 to actuate the transducer 10 as previously described. Concurrently a signal is fed from oscillator 12 to a time varying gain control circuit 30. Generally speaking, the time varying gain control circuit 30 provides a ramp voltage biasing signal which is applied by conductor 32 to first stage amplifier 22. The time varying bias signal appearing at conductor 32 is arranged so that the amplification occurring in first stage amplifier 22 is proportional to the time elapse after the signal originating in oscillator 12, that is, as the time following the initiation of a signal by oscillator 12 increases, the amplification of the signal in first stage amplifier 22 increases. This is accomplished by means of a time varying ramp voltage provided by the time varying gain control circuit 30 and applied to conductor 32.

By this arrangement the amplification of the echo signal received from transducer 10 is increased with time. Obviously, the longer it takes for the sound signal to pass from transducer 10 to a reflective surface and return, the greater is the distance between the transducer 10 and the reflective surface, and the echo signal is much fainter when reflected from a distant object than it is when reflected from an object nearer the transducer. By means of the time varying gain control signal provided at conductor 32 the first stage amplifier 22 is controlled so that its amplification increases with time to thereby amplify the signals received from distant objects and surfaces to a greater degree compared to those which are received from nearer objects and surfaces. This automatic gain control arrangement has many advantages. Since the sensitivity of the first stage amplifier 22 is low to signals reflected immediately after the sound pulse is applied to transducer 10, that is, less responsive to echo signals appearing at transducer 10 by nearby surfaces, there is greater immunity to false depth readings caused by air bubbles, small fish and other underwater objects between the surface and the bottom. In addition, since the receiver operates at a low gain level initially and then increases throughout the sound period, the time averaged amplifier gain required to sound a given water depth is reduced, which in turn reduces the amplifier susceptibility to spurious noise signals. Increased immunity is provided against spurious signals resulting from a second or third reflection from a previous sounding cycle.

An addition feature of this invention is the combination of the time varying gain control circuit with a manual gain control system. The second stage amplifier 24 includes a manual gain control circuit 34. By the manual gain control the operator can set the sensitivity of the depth sounder as required. The total sensitivity of the receiver portion of the depth sounder at any given instant following a sound pulse at transducer 10 is a summation of the manual gain control of circuit 34 plus the time varying gain control of circuit 30. Putting it another way, the total gain of the amplifier portion consisting of first and second stage amplifiers 22 and 24, is the manual gain control set by the operator having the automatic time varying gain control superimposed thereon.

While in the preferred arrangement the two stages of amplification 22 and 24 are utilized as shown with each stage having its separate gain control arrangement, that is, the first stage having the time varying gain control of circuit 32 and second stage having the manual gain control 34, it can be seen that in another embodiment of the invention only a single stage of amplification may be utilized with the manual and time varying gain control combined and applicable to such single stage amplification.

For a more detailed description of an embodiment of the invention, reference is now made to the circuit diagram of FIG. 2.

The oscillator portion includes: an NPN type transistor 36; transformer 38; condensers 40, 42 and 44; potentiometers 46 and 48; resistors 50, 52 and 54; and section 1 of a two section switch 56. The operation is as follows: When the function switch 56 is in position 3, current from the positive terminal of battery 58 flows through diode 60, through section 2 of switch 56, through fuse 62 and noise suppressor coil 64, through resistor 52 and potentiometer 48, and through section 1 of switch 56, charging capacitor 42. The base of transistor 36 is at the same direct current potential as capacitor 42 because of the path through the winding of the low impedance side of transformer 38. When the terminal voltage of capacitor 42 reaches a given voltage, such as +0.6 volt, transistor 36 is forward biased into conduction. The tuned circuit of transformer 38 and capacitor 44 is adjusted to the resonant frequency of the transducer 10. The low impedance winding of transformer 38 provides the alternating current feedback to the base of transistor 36. When transistor 36 conducts, oscillation starts. Rectification of the signal takes place in the base-emitter junction of transistor 36. This rectification causes capacitor 42 to discharge such as from +0.6 volt to zero potential and then charge to approximately −2.0 volts. Since conduction in transistor 36 occurs at +0.6 and a reverse bias of 0.6 plus 2.0 equals 2.6 volts exists and since the peak alternating current voltage developed across the low impedance winding of transformer 38 is 2.6 volts, oscillation ceases, and condenser 42 starts to charge toward the +0.6 volt thereby completing a timing cycle.

Figure 3:
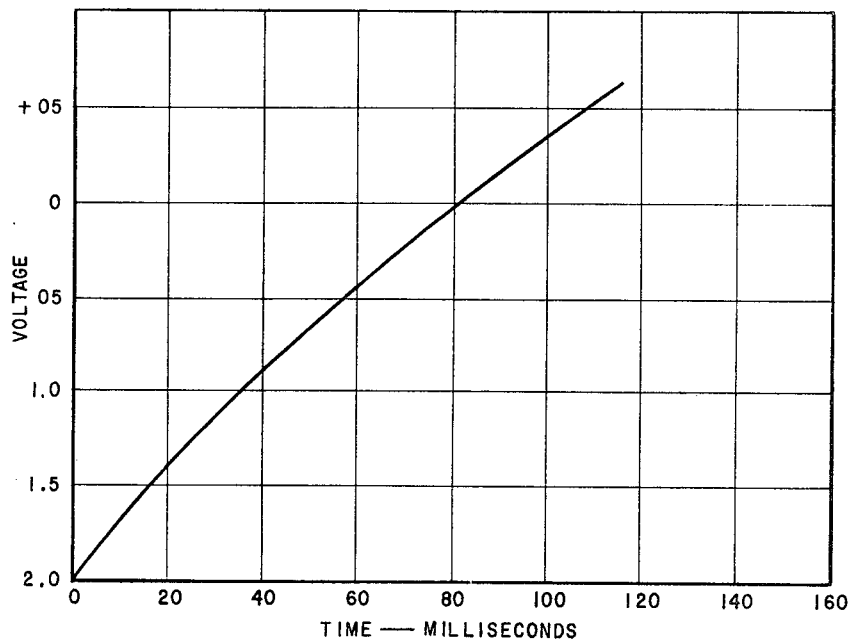
FIG. 3 is a graph of a typical time varying bias voltage applied to the amplifier portion of the invention whereby signals from distant objects are amplified more than signals from nearer objects.

The typical voltage signal appearing across capacitor 42 in relation to time is as shown in FIG. 3. This voltage is used as a time varying biasing signal to compensate the amplifier gain throughout the receiving portion of the sounding cycle as will be described in more detail subsequently.

Position 2 on switch 56 provides for a second range for deeper water utilizing resistor 50 and potentiometer 46. The oscillator operation in this position is the same as above with the additional feature of an increased pulse width on this range due to the added series resistor 54 which increases the time required for the base-emitter voltage of transistor 36 to change from +0.6 to −2.0 volts. This causes the pulse width of oscillation to increase correspondingly.

The pulsed signal from the oscillator is coupled to a class C power amplifier through capacitor 66. The power amplifier includes resistor 68, transistor 70, transformer 72 and condenser 74. Self biasing of transistor 70 is accomplished by resistor 68. The output at the collector is applied to a low impedance tap on the tuned winding of transformer 72. The energy from the tuned winding of transformer 72 is magnetically coupled to the transducer winding and applied to the transducer 10.

A returning acoustic echo is converted by the transducer 10 into a pulse of high frequency electrical energy. This pulse is applied to the transducer winding of transformer 72 which is magnetically coupled to the tuned winding of the same transformer. The high gain first amplifier stage includes: transistor 76; transformer 78; capacitors 80, 82 and 84; and resistors 86, 88, 90 and 92. The echo signal is coupled from the high impedance winding of transformer 72 to the base of transistor 76 by means of condenser 80. During the transmitted pulse, the high voltage which is developed across transformer 72 is prevented from damaging transistor 76 by the high reactance of condenser 80 (i.e., 150 pp. volts is dropped across condenser 80 during the transmitted pulse). The resistors 86, 90 and 92 establish the initial biasing of transistor 76. The capacitor 82 functions as an emitter bypass. The time varying ramp signal voltages from the oscillator is applied to the base of transistor 76 through the isolating resistor 88. Immediately after the transmission of the main pulse, this voltage is negative and reduces the forward bias of transistor 76 to a low value. As the elapsed time increases the forward bias increases, thus, the gain of transistor 76 is controlled over the entire receiving portion of the sounding cycle. The output of transistor 76 is applied to the tap on the primary winding of transformer 78. This winding is resonated to the operating frequency by capacitor 84. Transformer 78 provides an impedance transformation between the collector of transistor 76 and the base of the following stage.

The second stage of the tuned amplifier consists of the following components: transistor 94; transformer 96; potentiometer 98; condensors 100, 102 and 104; and resistors 106, 108, 110 and 112. The capacitors 100 and 102 provide a low impedance signal path from the secondary of transformer 78 to the base-emitter junction of transistor 94. The resistors 106 and 108 form a voltage divider which establishes the direct current potential on the base of transistors 94. The potentiometer 98 and resistor 112 form an adjustable voltage divider. The base-emitter junction of transistor 94 and resistor 110 are connected in series between these two voltage dividers, thus, establishing the base and emitter currents. Gain in the stage manually adjusted by potentiometer 98, is controlled by virtue of the dependence of transistor gain on emitter current and also by limiting the possible collector voltage swing. The signal at the collector of transistor 94 is applied to the tap on the primary of transformer 96. The capacitor 104 tunes the primary of transformer 96 to resonance and the signal is coupled to the detector by means of the secondary winding.

The detector components are: transistor 114; diode 116; condensers 118 and 120; and resistors 122, 124 and 126. The base of transistor 114 is biased to a point just below conduction by the voltage divider network of resistor 122 and diode 116. The positive going portion of the signal from transformer 96 drives transistor 114 into conduction thereby accomplishing detection. The resistor 124 provides a path for collector current flow. The capacitor 118 provides a low impedance path to ground for any high frequency component in the collector circuit. Capacitor 120 and resistor 126 perform a function of pulse shaping and resistor 126 also provides a DC return for diode 128.

The metering circuit consists of the following components: transistors 130 and 132; diode 134; Zener diode 136; meter 20; capacitors 140, 142 and 144; and resistors 146, 148, 150, 152, 154, 156, 158, 160 and 162.

The operation is as follows: During the transmitted pulse, a high frequency signal is coupled from the low impedance collector transformer 72 through the coupling capacitor 140 to diode 134. The resistor 146 functions as a DC return for diode 134. The capacitor 142 charges to a negative potential and this negative voltage is coupled through resistor 148 to the base of transistor 130. Since the base of transistor 130 is negative, the transistor is reverse biased and collector current ceases to flow. This allows the collector potential to rise toward the Zener voltage of diode 136 which in turn causes current to flow through resistor 154 into the base of transistor 132. Transistor 132 is biased on, producing a current flow through the meter 20. Current through meter 20 will continue to flow until a returning echo produces a signal at the collector of the detector transistor 114. The negative going leading edge of the echo pulse is conducted through the diode 128 to the base of transistor 132. This in turn drives transistor 132 out of conduction and, due to the increasing collector voltage of transistor 132, transistor 130 is again reset to the conducting condition. Since the emitter current of transistor 132 is a repetitive unipolar pulse of current the needle of meter 20 would be unsteady without capacitor 144. The capacity of capacitor 144 in conjunction with the meter resistance and resistor 162 provides a time constant sufficiently large to maintain a reasonably constant voltage across meter 20, thereby reducing the pulsation of the meter pointer.

In the illustrated embodiment of FIG. 2, the time varying gain control portion of the invention is achieved by applying voltage across the capacitor 42 through resistor 88 to the base of the first stage amplifier transistor 76. Manual control of the receiver gain is achieved through potentiometer 98 which varies the gain of the second stage amplifier transistor 94.

The two section switch 56 is illustrated as having four positions. Position 1 is in the off position. Positions 2 and 3 provide for measurement with varying ranges depending upon the values of capacitors 40 and 42, resistors 50 and 52 and potentiometers 46 and 48. Position 4 is a battery test position. In switch position 4 a resistor 164 is placed in series with meter 20 across battery 58. As long as battery 58 is properly charged sufficient current will flow through the resistor 164 and meter 20 to give a preselected minimum reading of the meter.

The invention as exemplified in the embodiment of FIG. 2 has been demonstrated in the circuit arrangement in which the circuit components have the following values:

Resistor:
```
50 ........................... 820K ohms.
52 ........................... 220K ohms.
54 ........................... 100K ohms.
68 ........................... 330 ohms.
86 ........................... 150K ohms.
88 ........................... 180K ohms.
90 ........................... 680K ohms.
92 ........................... 1K ohms.
106 .......................... 22K ohms.
108 .......................... 100K ohms.
110 .......................... 2.2K ohms.
112 .......................... 22K ohms.
122 .......................... 10K ohms.
124 .......................... 10K ohms.
126 .......................... 68K ohms.
146 .......................... 33K ohms.
148 .......................... 10K ohms.
150 .......................... 10K ohms.
152 .......................... 330K ohms.
154 .......................... 150K ohms.
156 .......................... 5.6K ohms.
158 .......................... 680 ohms.
160 .......................... 68K ohms.
162 .......................... 270 ohms.
164 .......................... 13.5K ohms.
```

Capacitor:
```
40 ........................... .82 mfd.
42 ........................... .2 mfd.
44 ........................... 1500 pf.
66 ........................... 1500 pf.
74 ........................... 1500 pf.
80 ........................... 250 pf.
82 ........................... .1 mfd.
84 ........................... 250 pf.
100 .......................... 1500 pf.
102 .......................... 5 mfd.
104 .......................... 250 pf.
118 .......................... .0047 mfd.
120 .......................... 1500 pf.
140 .......................... 250 pf.
142 .......................... 500 pf.
144 .......................... 3500 mfd.
```

Potentiometer:
```
46 ........................... 250K ohms.
48 ........................... 100K ohms.
98 ........................... 5K ohms.
```

Transistor:
```
36 ........................... Type 2N3860.
70 ........................... Type 2N3402.
76 ........................... Type 2N3860.
94 ........................... Type 2N3860.
114 .......................... Type 2N3860.
130 .......................... Type 2N3860.
132 .......................... Type 2N3860.
```

Diode:
```
60 ........................... Type 1N2069.
116 .......................... Type 1N2069.
128 .......................... Type 1N52.
134 .......................... Type 1N52.
136 .......................... Type 1N755.
```

Transformer:
```
38 ........................... Turns ratio 1 to 11.8.
72 ........................... Turns ratio 1 to 1.2.
78 ........................... Turns ratio 17.5 to 1.
96 ........................... Turns ratio 10 to 1.
```

Meter:
```
20 ........................... 1 ma full scale.
```

What is claimed:
1. An improved depth sounder for detecting the depth of objects under water comprising:
 a transducer means for imparting sound pulses in response to electrical energization and in turn for providing an electrical signal output in response to reflected sound pulses;
 a receiver amplifier circuit connected to said transducer means for amplifying the electrical signal output thereof in response to reflected sound waves;
 an oscillator circuit providing sequential bursts of electrical energy including:
  a transistor having a base, a collector, and an emitter,
  a voltage source having a negative pole and a positive pole,
  a transformer having a primary and a secondary, the secondary being between the transistor collector and the voltage source positive pole, the primary being in series with the transistor base,
  a resistor between the transformer primary and the voltage source positive pole, and
  a capacitor connected between the junction of the resistor and the transformer primary and the voltage source negative pole, the voltage across the capacitor providing a time varying biasing voltage;
 means coupling sequential bursts of electrical energy from said oscillator circuit to said transducer;

means impressing said time varying biasing voltage on said amplifier; and a metering circuit connected to said oscillator circuit and to said receiver amplifier providing means of indicating the time lapse between the transmitted signal and the signal in response to receipt of sound pulses as an indication of the distance to the surface reflecting the sound pulses from the transducer.

2. An improved depth sounder according to claim 1 including:

a power amplifier circuit having an input and an output, the input being connected to said oscillator circuit and the output being connected to said transducer means whereby said sequential bursts of electrical energy are amplified and passed to said transducer.

3. An improved depth sounder according to claim 1 including:

a second receiver amplifier circuit having an input and an output, the input being connected to said first mentioned receiver amplifier and the output being connected to said metering circuit providing two stages of amplification between said transducer means and said metering circuit; and a manual gain control in said second receiver amplifier circuit providing a two stage amplifier arrangement having a manual gain control and a time varying automatic gain control superimposed thereon.

4. An improved depth sounder according to claim 1 including:

a detector circuit having an input and an output, the input being connected to said receiver amplifier and the output connected to said metering circuit, the detector circuit providing means of detecting the occurrence of reflected sound pulses by said transducer means and actuating said metering circuit in response thereto.

5. An improved depth sounder according to claim 1 wherein said metering circuit includes a bi-stable multivibrator circuit, the transmitted signal from said oscillator circuit serving to set the multivibrator circuit in one of two stable states and the returning echo receiver by said transducer means and amplified by said receiver amplifier circuit serving to trigger the multivibrator circuit to the other of the stable states; and including a meter connected to measure average current flow occurring during one of the stable states of said multivibrator.

References Cited

UNITED STATES PATENTS

| | | | |
|---|---|---|---|
| 2,728,900 | 12/1955 | Ross | 340—3 |
| 3,061,812 | 10/1962 | Rachwalski | 340—3 |
| 3,223,965 | 12/1965 | Beebe | 340—3 |
| 3,278,861 | 10/1966 | Cunningham | 331—112 |
| 3,302,131 | 1/1967 | Pyatt | 331—112 |
| 3,380,001 | 4/1968 | Forrester | 331—112 |

RICHARD A. FARLEY, Primary Examiner

U.S. Cl. X.R.

331—112